(12) United States Patent
Omori et al.

(10) Patent No.: US 9,775,094 B2
(45) Date of Patent: Sep. 26, 2017

(54) SYSTEM, INFORMATION TERMINAL, AND INFORMATION NOTIFICATION METHOD

(71) Applicant: Alpine Electronics, Inc., Tokyo (JP)

(72) Inventors: Toshiyuki Omori, Iwaki (JP);
Kazuhito Tezuka, Iwaki (JP); Komi Tsumura, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/357,738

(22) Filed: Nov. 21, 2016

(65) Prior Publication Data

US 2017/0201929 A1 Jul. 13, 2017

(30) Foreign Application Priority Data

Jan. 8, 2016 (JP) .................. 2016-002571

(51) Int. Cl.
*H04W 48/02* (2009.01)
*H04W 68/00* (2009.01)
*H04B 1/3827* (2015.01)
*H04W 48/08* (2009.01)
*H04W 88/06* (2009.01)

(52) U.S. Cl.
CPC ............ *H04W 48/02* (2013.01); *H04B 1/385* (2013.01); *H04W 48/08* (2013.01); *H04W 68/005* (2013.01); *H04W 88/06* (2013.01)

(58) Field of Classification Search
CPC ......... H04B 1/385; H04B 7/00; H04W 48/08; H04W 68/005; H04W 4/021; H04W 48/02; H04W 88/06; G06F 17/30598; G06F 17/30528; G06F 17/30241; H04L 63/08; H04L 67/26; H04L 63/10
See application file for complete search history.

(56) References Cited

U.S. PATENT DOCUMENTS

| 9,630,496 B2* | 4/2017 | Cuddihy .................. B60N 2/00 |
| 2012/0196534 A1* | 8/2012 | Kasslin ............... H04W 76/002 455/41.2 |
| 2015/0222615 A1* | 8/2015 | Allain .................... H04L 63/08 726/4 |
| 2016/0371645 A1* | 12/2016 | Serjeantson .......... H04W 4/021 |
| 2017/0053015 A1* | 2/2017 | Liongosari ........ G06F 17/30598 |

FOREIGN PATENT DOCUMENTS

| JP | 2010-187421 | 8/2010 |
| JP | 2012-147146 | 8/2012 |

* cited by examiner

*Primary Examiner* — Nizar Sivji
(74) *Attorney, Agent, or Firm* — Brinks Gilson & Lione

(57) ABSTRACT

When a portable information terminal receives a mail, a comment, a message, or update information, notification about the reception is performed also on a smartwatch, and a user may check reception of various types of information on the smartwatch. In the present invention, for example, when ACC is turned on to supply power to a car-mounted device, the car-mounted device transmits a request signal for establishing a wireless connection to the portable information terminal that is present near the car-mounted device. When the request signal is obtained from the car-mounted device, the portable information terminal determines that driving is to start, and causes information not to be displayed on a screen of the smartwatch during driving.

19 Claims, 11 Drawing Sheets

FIG. 3

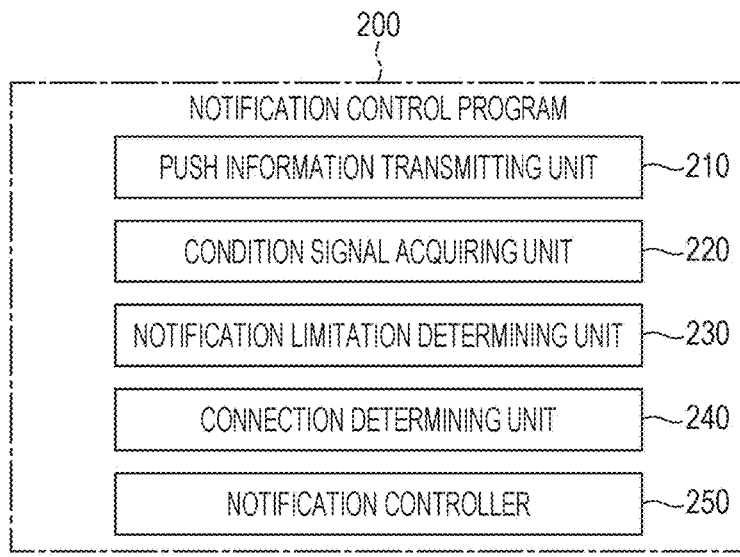

FIG. 4

| CONDITION SIGNAL | NOTIFICATION LIMITATION | NORMAL NOTIFICATION |
|---|---|---|
| ACC | ON | OFF |
| DISTANCE FROM VEHICLE | WITHIN CERTAIN DISTANCE | AWAY BY DISTANCE LONGER THAN CERTAIN DISTANCE |
| PARKING SIGNAL | OFF | ON |
| VEHICLE SPEED | EQUAL TO OR HIGHER THAN CERTAIN SPEED | SLOWER THAN CERTAIN SPEED |

FIG. 5

| DEVICE NAME | MAJOR CLASS | MINOR CLASS | STATUS |
|---|---|---|---|
| NAME A | 00010 | 000001 | NOT CONNECTED |
| NAME B | 00001 | 000110 | CONNECTED |
| NAME C | 00100 | 000110 | NOT CONNECTED |

FIG. 6
| SETTING CODE | DESCRIPTION ABOUT SETTING |
|---|---|
| 00 | DEFAULT STATE |
| 01 | DISABLE ONLY DISPLAY |
| 10 | DISABLE DISPLAY AND SOUND |
| 11 | DISABLE ALL OUTPUTS |
FIG. 7
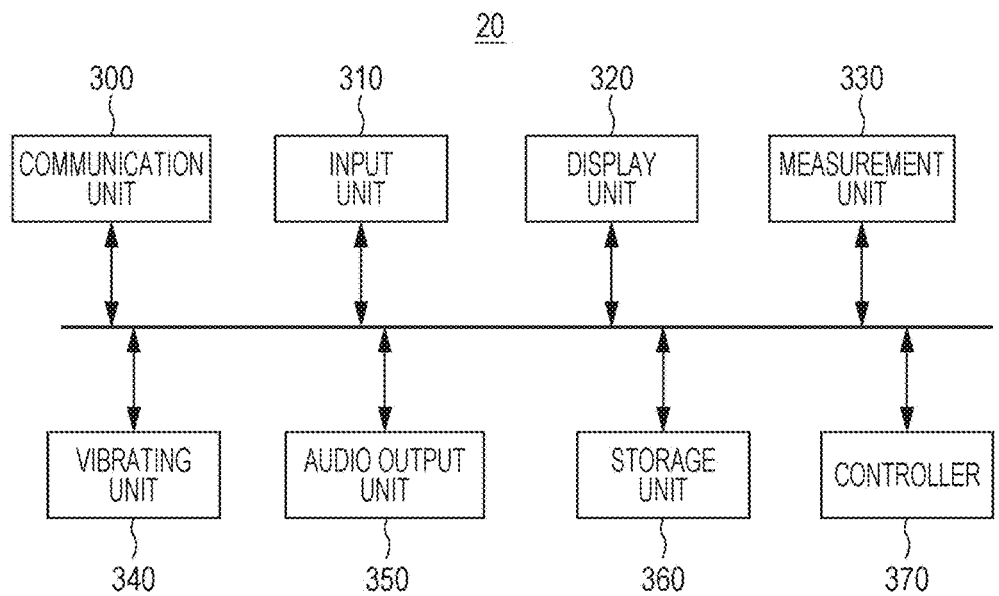
FIG. 8
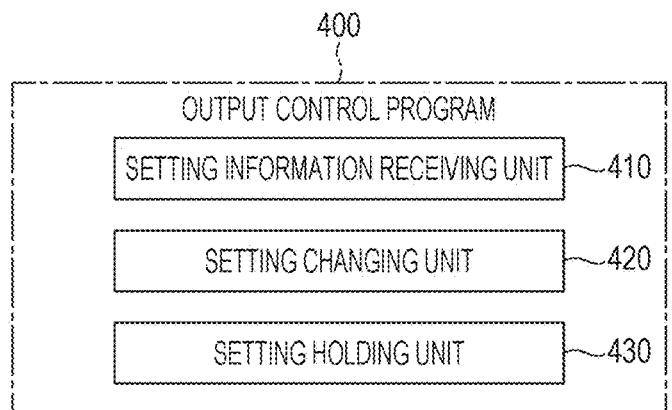

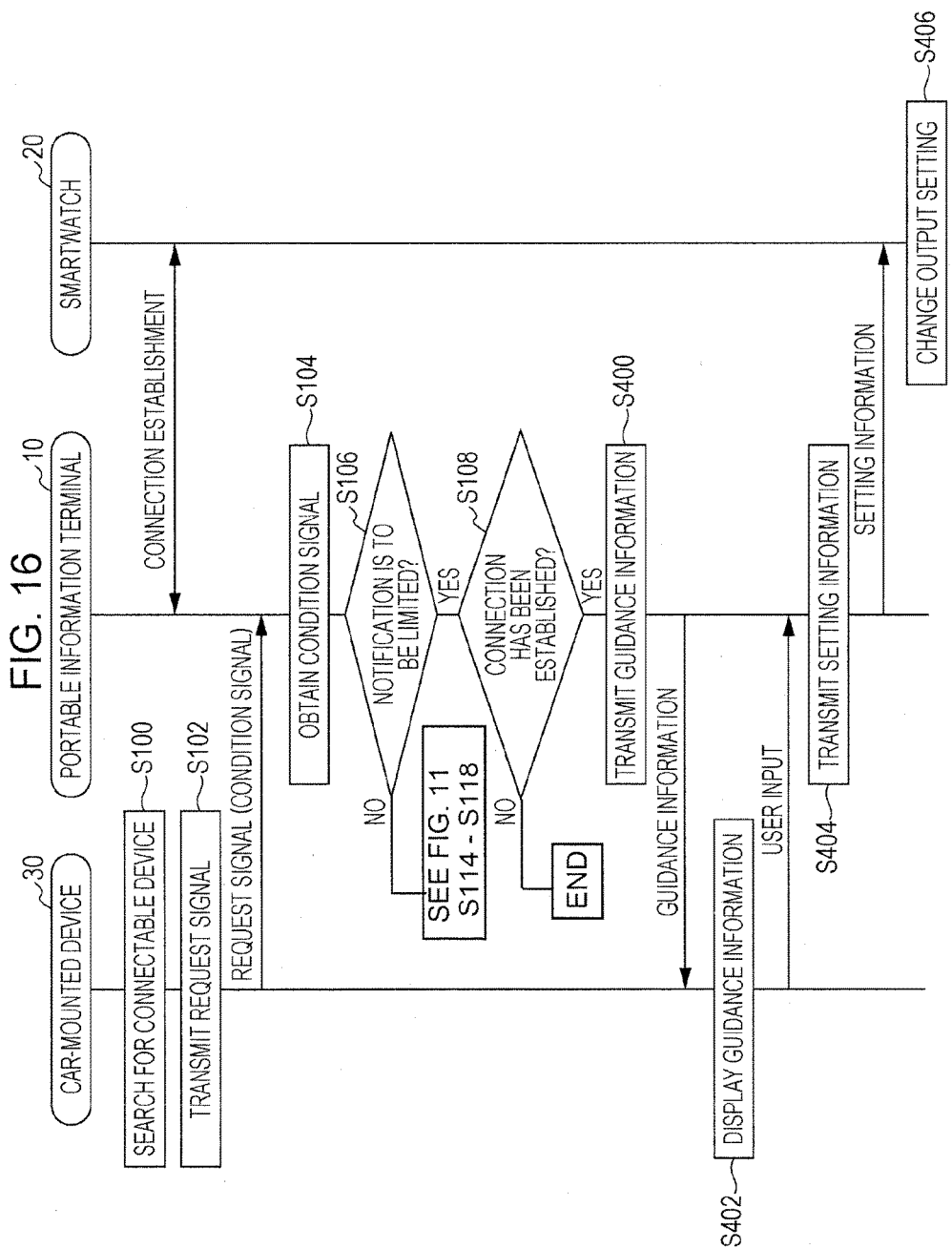

SYSTEM, INFORMATION TERMINAL, AND INFORMATION NOTIFICATION METHOD

RELATED APPLICATION

The present application claims priority to Japanese Patent Application Number 2016-002571, filed Jan. 8, 2016, the entirety of which is hereby incorporated by reference.

BACKGROUND

1. Field

The present disclosure relates to a method for transmitting information to a portable terminal such as a wearable terminal connected to an information terminal, and particularly to an information notification method used when a portable information terminal connected to a wearable terminal is connected to a car-mounted device mounted inside a vehicle.

2. Description of the Related Art

As multi-function portable terminals typified by smartphones become widely available, new services or systems in which smartphones collaborate with other external equipment also become widely available. For example, a car-mounted device such as a car navigation device is connected to a smartphone so that functions included in the smartphone may be performed from the car-mounted device, enabling the functions of the smartphone to be enjoyed in the vehicle cabin. Recently, small wearable terminals, such as a bracelet smartwatch and an eyeglass-type terminal, worn on a human body are becoming available. It is anticipated that collaboration of the small wearable terminals with smartphones will cause new services such as human body health care to become available.

A smartwatch is worn on a person's wrist, like the way in which a wristwatch is worn, and is capable of obtaining heartbeat information and the like of the wearer. A smartwatch is capable of being connected to a portable information terminal such as a smartphone through wireless communication using Bluetooth® or the like. By using dedicated applications and the like, the connected smartphone may manage, as a health log, information such as the heartbeat information obtained by a smartwatch. In contrast, smartphones are capable of being wirelessly connected to not only a smartwatch but also a car-mounted device such as a car navigation device mounted inside a vehicle. A single smartphone may perform wireless communication with multiple other devices. Japanese Unexamined Patent Application Publication No. 2012-147146 discloses a connection control method used when a device connected to a certain device receives a connection request from a different device. Japanese Unexamined Patent Application Publication No. 2010-187421 discloses a communication device which achieves a reduction in time required for operations of specifying and changing a communication target in communication using Bluetooth®.

In the case where a smartwatch is connected to a portable information terminal such as a smartphone, for example, when information on an event, such as mail reception and a pop-up display, is transmitted to the smartphone, the information is further transmitted from the smartphone to the smartwatch. On the smartwatch, the notification information is displayed, a sound is output, or the smartwatch is vibrated. This is convenient for a user because the user may easily view the notification without having to take out their smartphone.

However, when the user is in a vehicle while their smartwatch is connected to their smartphone, a notification transmitted to the smartphone is transmitted to the smartwatch even while driving. As illustrated in FIG. 17, a driver moves their line of sight to a smartwatch W to view a display screen D of the smartwatch W. This action is not desirable from the viewpoint of safe driving. In some conditions, a notification about pop-up information or the like transmitted to a smartphone is not necessarily displayed on both of the smartphone and the smartwatch, and a notification displayed on only the smartphone may be sufficient.

SUMMARY

The present disclosure is made to address such an issue of the related art, and an object of the present disclosure is to provide a system, an information terminal, an information notification program, and an information notification method in which, in a state in which an information terminal is connected to a portable terminal, notification of information obtained by the information terminal may be limited on the portable terminal depending on conditions.

A system according to a first aspect of the disclosure includes a portable terminal, an information terminal, and an electronic device. The information terminal includes a first communication unit, a second communication unit, an acquiring unit, a notifying unit, a determining unit, and a controller. The first communication unit enables wireless communication to be performed with the portable terminal. The second communication unit enables wireless communication to be performed with the electronic device. The acquiring unit acquires external information. The notifying unit is capable of, when the acquiring unit obtains the information, transmitting a notification about acquisition of the information via the first communication unit to the portable terminal. The determining unit determines whether or not a notification operation of the portable terminal is to be limited, on the basis of a condition signal received from the electronic device via the second communication unit. The controller controls the notifying unit on the basis of a determination result obtained by the determining unit.

When it is determined that the notification operation of the portable terminal is to be limited, the controller may cause the notifying unit not to transmit the notification about acquisition of the information to the portable terminal. When it is determined that the notification operation of the portable terminal is to be limited, the controller may cause setting information to be transmitted to the portable terminal. The setting information causes the notification operation of the portable terminal to be limited. The setting information may include information for changing an output setting of the portable terminal. The setting information may be used to disable displaying on the portable terminal and to enable a different output. The different output may be a vibration output of the portable terminal. The different output may be an audio output of the portable terminal. The information terminal may further include an accumulating unit that, when it is determined that the notification operation of the portable terminal is to be limited, accumulates the notification about acquisition of the information. When it is determined that the notification operation of the portable terminal is not to be limited, the controller may transmit the notification about acquisition of the information via the first communication unit to the portable terminal. The notification is accumulated by the notifying unit. When the condition signal indicates an engine start of a vehicle, the determining unit may determine that the notification operation of the portable terminal is to be limited. When the condition signal indicates a vehicle speed equal to or larger than a certain value, the determining unit may determine that the notification operation of the portable terminal is to be limited. When the condition signal indicates that a vehicle has stopped, the determining unit may determine that the notification operation of the portable terminal is not to be limited. When the condition signal indicates that a distance from a vehicle is equal to or smaller than a certain value, the determining unit may determine that the notification operation of the portable terminal is to be limited. The portable terminal may be a wearable terminal which is capable of being worn on a user's human body. The information terminal may further include a providing unit that, when information about the human body is received via the first communication unit from the wearable terminal, provides the information about the human body via the second communication unit to the electronic device. When a heart rate or a blood pressure which is included in the information about the human body becomes equal to or larger than a certain value, the providing unit may further provide recommendation information via the second communication unit to the electronic device. The notifying unit may further transmit the notification about acquisition of the information via the second communication unit to the electronic device. When it is determined that the notification operation of the wearable terminal is to be limited, the controller may further cause guidance information to be displayed on the electronic device. The guidance information specifies that the notification operation of the wearable terminal is to be limited. When a user input is received in response to the guidance information, the controller may further perform notification limitation on the wearable terminal. The electronic device may be a car-mounted electronic device. The notification about acquisition of the information may include a push notification or a pop-up notification.

An information terminal according to a second aspect of the disclosure includes a first communication unit, a second communication unit, an acquiring unit, a notifying unit, a determining unit, and a controller. The first communication unit enables wireless communication to be performed with a portable terminal. The second communication unit enables wireless communication to be performed with an electronic device. The acquiring unit acquires external information. The notifying unit is capable of, when the acquiring unit obtains the information, transmitting a notification about acquisition of the information via the first communication unit to the portable terminal. The determining unit determines whether or not a notification operation of the portable terminal is to be limited, on the basis of a condition signal received from the electronic device via the second communication unit. The controller controls the notifying unit on the basis of a determination result obtained by the determining unit.

An information notification program according to a third aspect of the disclosure is executed by an information terminal including a first communication unit, a second communication unit, and an acquiring unit. The first communication unit enables wireless communication to be performed with a portable terminal. The second communication unit enables wireless communication to be performed with an electronic device. The acquiring unit acquires external information. The program causes the information terminal to execute a process including determining whether or not a notification operation of the portable terminal is to be limited, on the basis of a condition signal received via the second communication unit from the electronic device; and, in the case where it is determined that the notification operation of the portable terminal is not to be limited, when the acquiring unit acquires the information, transmitting a notification about acquisition of the information via the first communication unit to the portable terminal; and, in the case where it is determined that the notification operation of the portable terminal is to be limited, transmitting, to the portable terminal, setting information for changing an output setting of the portable terminal.

An information notification method according to a fourth aspect of the disclosure is performed in an information terminal including a first communication unit, a second communication unit, and an acquiring unit. The first communication unit enables wireless communication to be performed with a portable terminal. The second communication unit enables wireless communication to be performed with an electronic device. The acquiring unit acquires external information. The method includes determining whether or not a notification operation of the portable terminal is to be limited, on the basis of a condition signal received via the second communication unit from the electronic device; and, in the case where it is determined that the notification operation of the portable terminal is not to be limited, when the acquiring unit acquires the information, transmitting a notification about acquisition of the information via the first communication unit to the portable terminal; and, in the case where it is determined that the notification operation of the portable terminal is to be limited, transmitting, to the portable terminal, setting information for changing an output setting of the portable terminal.

According to the aspects of the present disclosure, it is determined whether or not notification operations of the portable terminal are to be limited, on the basis of the condition signal received from the electronic device. On the basis of the determination result, the notifying unit is controlled. Therefore, depending on conditions, notification of information obtained by the information terminal may be limited on the portable terminal. For example, when the information terminal connected to the portable terminal is carried into a vehicle cabin, a driver does not need to view the display on the portable terminal, achieving prevention of dangerous driving.

BRIEF DESCRIPTION OF THE DRAWINGS

FIG. 3 is a diagram illustrating the functional configuration of a notification control program of the portable information terminal according to the first embodiment;

FIG. 4 is a table illustrating exemplary determinations of notification limitation on a smartwatch based on a condition signal;

FIG. 5 is diagram illustrating exemplary connection information for determining whether or not a connection with a smartwatch has been established;

FIG. 6 is a diagram illustrating exemplary setting information which is to be transmitted from the portable information terminal to a smartwatch;

FIG. 7 is a block diagram illustrating an exemplary configuration of a smartwatch according to the first embodiment;

FIG. 8 is a diagram illustrating the functional configuration of an output control program of the smartwatch according to the first embodiment;

FIG. 16 is a flow diagram illustrating operations performed in an information notifying system according to the fourth embodiment of the present disclosure.

DESCRIPTION

Figure 1:
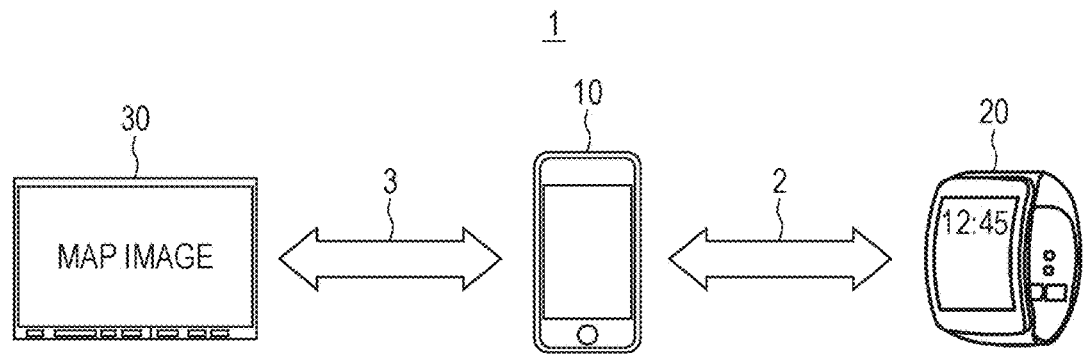
FIG. 1 is a diagram illustrating the configuration of an information notifying system according to a first embodiment of the present disclosure.

Embodiments of the present disclosure will be described. In the embodiments of the present disclosure, an information terminal may be, for example, a smartphone, a tablet terminal, or a laptop terminal. The information terminal may be provided with wireless communication functions (for example, Wireless Fidelity (Wi-Fi) or near field communication (NFC)) using a short-range protocol and wireless communication functions (for example, 3G, 4G, Long Term Evolution (LTE), or Worldwide Interoperability for Microwave Access (WiMAX)) using a wide-area protocol, and is capable of collaborating, for example, with an external network, a wearable terminal and a car-mounted device which are described below, and the like. Further, the information terminal may be provided with a software application which collaborates with functions of the wearable terminal. For example, a certain application may process information about a human body (such as a heart rate and a blood pressure) which is obtained through measurement performed by the wearable terminal, and may manage and output the information. Further, another application may change an output setting of the wearable terminal and limit notification operations of the wearable terminal depending on conditions. The information terminal may be provided with not only the function of collaborating with a wearable terminal but also other functions, for example, a calling function, a navigation function, a function of playing back audio/video data, and a function of receiving a television/radio signal.

The portable terminal may be a portable information terminal, such as a smartphone or a tablet terminal. The portable terminal may also be a wearable terminal worn directly or indirectly on a human body. The wearable terminal may be worn on a person's arm, leg, head, or the like. For example, the wearable terminal may be a smartwatch which is a wristwatch worn on a wrist. The wearable terminal may be provided with a function of performing wireless communication with an information terminal in order to collaborate with the information terminal. Further, the wearable terminal may have a function of measuring information about a human body, for example, a blood pressure and a heart rate, and transmits the measurement information to the information terminal. Furthermore, the wearable terminal may have a function of, while the wearable terminal is connected to an information terminal, when the information terminal receives a mail or an update of a social networking service, receiving the information from the information terminal and outputting the information. The reception of a mail or the like is notified to a user, for example, through a display screen, a sound, or a vibration.

The electronic device may be a computer apparatus, a car-mounted device, a tablet terminal, or the like. The electronic device may be provided with a wireless communication function for collaborating with an information terminal, and further provides, to the information terminal, a condition signal which is necessary to determine whether or not notification operations of a wearable terminal are to be limited. The condition signal is a signal for determining the environment in which the wearable terminal is used. The electronic device may also be a car-mounted device provided with a navigation function, a function of playing back audio/video data, a function of receiving a television/radio signal, a data communication function, and the like. The car-mounted device may further include a detection unit which detects the condition of the vehicle. For example, the electronic device may obtain information about the vehicle, such as gear position information or a vehicle speed, and provide the information to the information terminal as a condition signal.

FIG. 1 is a diagram illustrating the configuration of an information notifying system according to a first embodiment of the present disclosure. An information notifying system 1 according to the first embodiment includes a portable information terminal 10 such as a smartphone, a smartwatch 20, and a car-mounted device 30. The portable information terminal 10 is capable of being connected to the smartwatch 20 via a connecting unit 2 which is a two-way wireless connection. The portable information terminal 10 is further capable of being connected to the car-mounted device 30 via a connecting unit 3 which is a two-way wireless connection.

Figure 2:
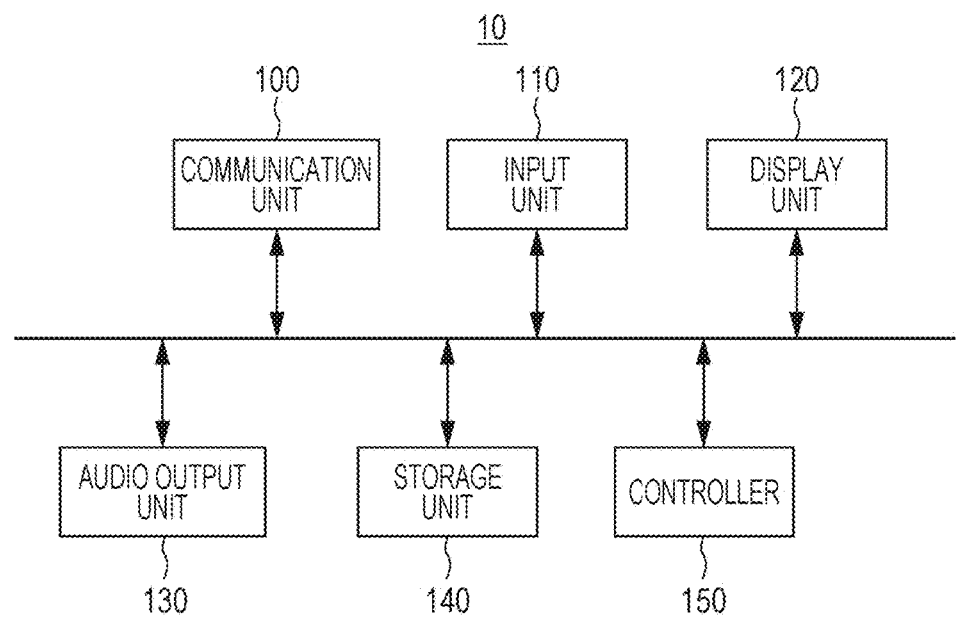
FIG. 2 is a block diagram illustrating an exemplary configuration of a portable information terminal according to the first embodiment.

FIG. 2 is a block diagram illustrating the configuration of the portable information terminal 10. As illustrated in FIG. 2, the portable information terminal 10 includes a communication unit 100, an input unit 110, a display unit 120, an audio output unit 130, a storage unit 140, and a controller 150. However, this is a typical exemplary configuration, and the portable information terminal 10 may have functions other than those described above.

The communication unit 100 enables wireless communication with external equipment including the smartwatch 20 and the car-mounted device 30 to be performed. The communication unit 100 is provided with a wireless communication function, such as Bluetooth®, Wi-Fi®, WiMAX, 3G, 4G, and LTE. In the description below, for the sake of convenience, connection using Bluetooth® is referred to as BT connection. The communication unit 100 is capable of establishing a BT connection, for example, with the smartwatch 20 and the car-mounted device 30 simultaneously. In this case, a connection is established with the smartwatch 20 and the car-mounted device 30 through profiles of the channels for the smartwatch 20 and the car-mounted device 30. The communication unit 100 which is further capable of being wirelessly connected to an external network, an external server, and the like may communicate with a mail server, a server that provides a social networking service, and the like, and may receive various types of information, such as a mail, a comment, a message, and update information, from the mail server or the like. In the description below, for the sake of convenience, a mail, a comment, a message, update information, and the like which are received by the portable information terminal 10 via the communication unit 100 from an external server or the like are collectively referred to as "external information".

The input unit 110 receives an instruction from a user through a touch panel, an input key device, a voice input recognizing device, or the like, and provides the instruction to the controller 150. The display unit 120 includes, for example, a liquid crystal display or an organic electroluminescent (EL) panel. By touching icons and the like displayed on the display unit 120, applications may be executed. When external information is received via the communication unit 100, a notification that external information has been received may be displayed on the display unit 120. In the description below, for the sake of convenience, a notification that external information has been received is referred to as a push notification or a pop-up notification. The audio output unit 130 outputs audio data stored in the storage unit 140, and, when the external information has been received through the communication unit 100, outputs a sound indicating the reception.

The storage unit 140 may store programs for executing functions specific to the portable information terminal 10, application programs downloaded from an external server or the like, and the like. The application programs may be, for example, an application which enables collaboration with the smartwatch 20, an application which changes setting information of the smartwatch 20, and an application which enables collaboration with the car-mounted device 30. Further, the application programs may include applications, such as a navigation function, a music playback function, and an Internet browser.

In a preferable embodiment, the controller 150 may include a microcontroller including a read-only memory (ROM) and a random-access memory (RAM), and the ROM or the RAM may be used to store various programs for controlling operations of the units of the portable information terminal 10. In the first embodiment, the controller 150 executes a notification control program 200 which causes notification operations of the smartwatch 20 to be controlled on the basis of a condition signal transmitted from the car-mounted device 30.

FIG. 3 is a diagram illustrating an exemplary functional configuration of the notification control program. The notification control program 200 includes a push information transmitting unit 210, a condition signal acquiring unit 220, a notification limitation determining unit 230, a connection determining unit 240, and a notification controller 250.

When the portable information terminal 10 receives external information via the communication unit 100, the push information transmitting unit 210 transmits, to the smartwatch 20, information (hereinafter referred to as push information) about a push notification or a pop-up notification. When external information is received, a push notification may be displayed on the display unit 120 of the portable information terminal 10, or a sound may be output from the audio output unit 130.

The condition signal acquiring unit 220 acquires a condition signal transmitted from the car-mounted device 30. The condition signal is information for determining the environment in which the smartwatch 20 is used. For example, in the case where a BT connection is to be established between the car-mounted device 30 and the portable information terminal 10, when power is supplied to the car-mounted device 30, the car-mounted device 30 transmits a request signal for establishing a connection with the portable information terminal 10. The condition signal acquiring unit 220 may acquire such a request signal as a condition signal. Alternatively, in another example, when a connection has been established between the car-mounted device 30 and the portable information terminal 10, the condition signal acquiring unit 220 may acquire information about the state of the vehicle from the car-mounted device 30 as a condition signal. For example, information for determining whether the vehicle is running or stopping, gear position information, vehicle speed information, and the like are obtained. Further, the condition signal acquiring unit 220 may acquire, as a condition signal, distance information indicating a distance at which the portable information terminal 10 is located away from the car-mounted device 30. The distance information indicates, for example, a distance within which wireless communication is capable of being performed through a BT connection, and is a signal representing whether or not a BT connection has been established between the portable information terminal 10 and the car-mounted device 30.

The notification limitation determining unit 230 determines whether or not notification operations of the smartwatch 20 are to be limited, on the basis of a condition signal acquired by the condition signal acquiring unit 220. For example, when it is presumed that a user who is wearing the smartwatch 20 is driving, the notification limitation determining unit 230 determines that notification operations of the smartwatch 20 are to be limited. This is because, when notification operations are performed on the smartwatch 20 during driving, the line of sight of the user which is guided to the smartwatch 20 causes an obstacle to safe driving. Specifically, when a condition signal represents a request signal which is used to establish a wireless connection and which is transmitted from the car-mounted device 30, it is presumed that a user is present in the vehicle cabin and that driving is now to be started. Therefore, the notification limitation determining unit 230 determines that notification operations of the smartwatch 20 are to be limited.

The notification limitation determining unit 230 may further determine whether or not notification operations of the smartwatch 20 are to be limited, on the basis of another condition signal. FIG. 4 illustrates the examples. For example, when the condition signal indicates distance information, if the portable information terminal 10 approaches the car-mounted device 30 within a certain distance, the notification limitation determining unit 230 determines that the notification operations are to be limited. If the portable information terminal 10 is located away from the car-mounted device 30 at a distance longer than the certain distance, the notification limitation determining unit 230 determines that the notification operations are not to be limited. For example, in the case where the vehicle is stopped while the engine is operating and where the user is temporarily out of the vehicle, if the portable information terminal 10 carried by the user is located away from the vehicle at a distance longer than the certain distance (that is, the distance exceeds a distance in which communication may be performed through a BT connection), the notification limitation determining unit 230 determines that notification limitation is not to be performed. When the user is to get on the vehicle again, if the portable information terminal 10 approaches the vehicle within the certain distance (that is, the distance is equal to or shorter than a distance in which communication may be performed through a BT connection), the notification limitation determining unit 230 determines that notification limitation is to be performed. When the condition signal indicates gear position information, if the gear position indicates a parking signal, the notification limitation determining unit 230 determines that the notification limitation is not to be performed. If the gear position indicates a signal other than a parking signal, the notification limitation determining unit 230 determines that the notification limitation is to be performed. Further, when the condition signal indicates vehicle speed information, if the vehicle speed is equal to or higher than a certain speed, the notification limitation determining unit 230 determines that the notification limitation is to be performed. If the vehicle speed is slower than the certain speed, the notification limitation determining unit 230 determines that the notification limitation is not to be performed. The notification limitation determining unit 230 may determine whether or not notification operations of the smartwatch 20 are to be limited, on the basis of a weighted requirement in which one or more condition signals illustrated in FIG. 4 are combined.

If the notification limitation determining unit 230 determines that notification operations of the smartwatch 20 are to be limited, the connection determining unit 240 determines whether or not the connecting unit 2 has been established between the portable information terminal 10 and the smartwatch 20. For example, the portable information terminal 10 holds connection information indicating devices to which the portable information terminal 10 has been connected, and the connection determining unit 240 may refer to the connection information to determine whether or not the smartwatch 20 has been connected. FIG. 5 illustrates exemplary connection information. In FIG. 5, the device name indicates the name of a connectable device having, for example, BT equipment. The major class indicates a superordinate category of the connectable device. The minor class indicates a subordinate category of the connectable device. The status indicates a connection status.

For example, a major class code of "00001" indicates a wearable terminal. A minor class code of "000110" indicates a smartwatch. In this example, the connection determining unit 240 determines that the smartwatch 20 whose name is B has been connected via the communication unit 100.

In the cases where the notification limitation determining unit 230 determines that notification operations of the smartwatch 20 are to be limited and where the connection determining unit 240 determines that the smartwatch 20 has been connected, the notification controller 250 generates setting information for limiting notification operations of the smartwatch 20, and transmits the setting information to the smartwatch 20. The smartwatch 20 interprets the setting information and disables notification of push information transmitted from the portable information terminal 10. FIG. 6 illustrates exemplary setting information. For example, it is assumed that the smartwatch 20 is provided with a display output, an audio output, and a vibration output, as units which output information. If the notification limitation determining unit 230 determines that notification operations of the smartwatch 20 are not to be limited, the notification controller 250 does not transmit the setting information or transmits a setting code of "00", and returns the output setting of the smartwatch 20 back to the default state. The setting code "00" activates all of the display, the sound, and the vibration of the smartwatch 20. In contrast, if the notification limitation determining unit 230 determines that notification operations of the smartwatch 20 are to be limited, the notification controller 250 transmits one of setting codes of "01", "10", and "11". The setting code "01" deactivates only the display of the smartwatch 20, and activates the sound and the vibration. The setting code "10" deactivates the display and the sound and activates only the vibration. The setting code "11" deactivates all of the display, the sound, and the vibration.

FIG. 7 illustrates an exemplary configuration of the smartwatch 20. The smartwatch 20 includes a communication unit 300, an input unit 310, a display unit 320, a measurement unit 330, a vibrating unit 340, an audio output unit 350, a storage unit 360, and a controller 370. The configuration illustrated in FIG. 7 is an example, and another configuration and other functions may be included.

The communication unit 300 enables wireless communication to be performed with external equipment including the portable information terminal 10. The communication unit 300 establishes the connecting unit 2, for example, through a BT connection. While the smartwatch 20 is connected to the portable information terminal 10 via the communication unit 300, the smartwatch 20 may receive push information transmitted from the push information transmitting unit 210 of the portable information terminal 10.

The input unit 310 receives an instruction from a user, and provides the instruction to the controller 370. The display unit 320, for example, displays the current time, displays push information transmitted from the portable information terminal 10, and displays information about the human body which is obtained through measurement performed by the measurement unit 330. The measurement unit 330 measures a blood pressure, a heart rate, and other information about the human body. For example, the communication unit 300 transmits the measurement information to the portable information terminal 10. The vibrating unit 340 informs a user of information through a vibration. For example, when push information is received from the portable information terminal 10, the vibrating unit 340 produces a vibration. The audio output unit 350 outputs a beep or the like, for example, when push information is received from the portable information terminal 10.

The storage unit 360 may store data used by the smartwatch 20, programs for executing specific functions of the smartwatch 20, application programs downloaded from an external server, and the like. The application programs may include, for example, an application for enabling collaboration with the portable information terminal 10, and applications for any other functions.

The controller 370 may include a microcontroller including a ROM and a RAM, and the ROM or the RAM may be used to store various programs for controlling operations of the units of the smartwatch 20. In the first embodiment, the controller 370 executes an output control program 400 for controlling output on the basis of the setting information transmitted from the portable information terminal 10.

FIG. 8 illustrates the functional configuration of the output control program 400. The output control program 400 includes a setting information receiving unit 410, a setting changing unit 420, and a setting holding unit 430. The setting information receiving unit 410 receives the setting information transmitted from the notification controller 250 of the portable information terminal 10. The setting changing unit 420 determines whether or not the output setting of the smartwatch 20 is to be changed, on the basis of the received setting information. If the setting changing unit 420 determines that the output setting is to be changed, the setting changing unit 420 changes the output setting. For example, when the setting information is information illustrated in FIG. 6, the setting changing unit 420 interprets the setting code. When it is different from the current output setting, the setting changing unit 420 changes the output setting. For example, in the case where the current output setting has been set to the default state in which all of the display unit 320, the vibrating unit 340, and the audio output unit 350 are activated, when the setting code is "01", the setting changing unit 420 changes the output setting so that only the display unit 320 is deactivated and that the vibrating unit 340 and the audio output unit 350 are activated. The output setting changed by the setting changing unit 420 is held by the setting holding unit 430.

Figure 9:
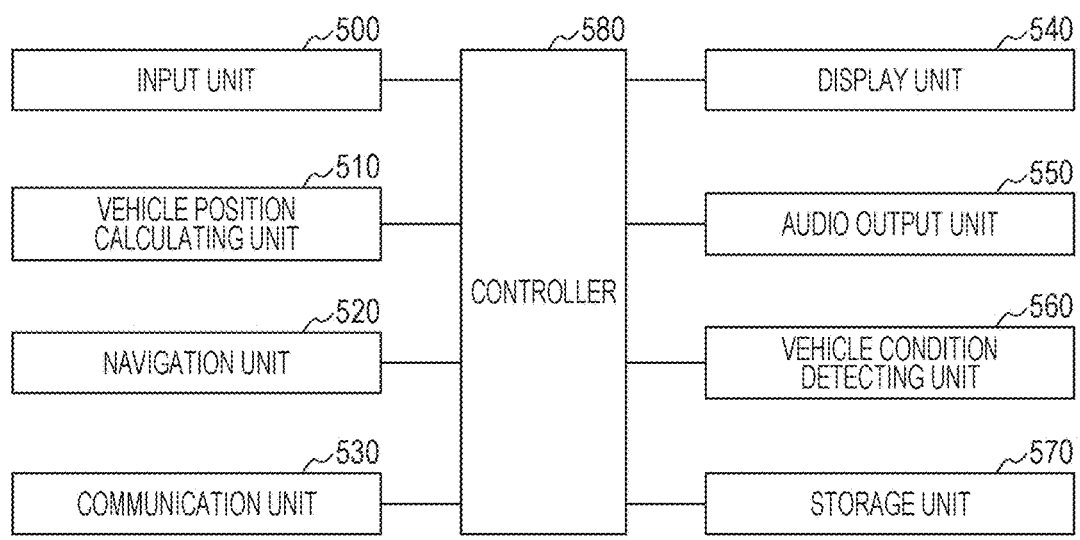
FIG. 9 is a block diagram illustrating an exemplary configuration of a car-mounted device according to the first embodiment.

FIG. 9 illustrates an exemplary configuration of the car-mounted device 30. The car-mounted device 30 includes an input unit 500, a vehicle position calculating unit 510, a navigation unit 520, a communication unit 530, a display unit 540, an audio output unit 550, a vehicle condition detecting unit 560, a storage unit 570, and a controller 580. The configuration illustrated in FIG. 9 is an example, and another configuration and other functions may be included.

The input unit 500 receives an input from a user, and provides the input to the controller 580. The input unit 500 includes, for example, a touch panel, an input key device, and a voice input. The vehicle position calculating unit 510 calculates the vehicle position by using a vehicle speed sensor, an acceleration sensor, a Global Positioning System (GPS) satellite, or the like. The navigation unit 520 displays a road map around the vehicle on the display unit 540 on the basis of positional information calculated by the vehicle position calculating unit 510, and searches for a route to a destination and provides guidance on the route.

As described above, the communication unit 530 establishes the connecting unit 3 with the portable information terminal 10, and enables wired and/or wireless communication to be performed with the portable information terminal 10. Preferably, the communication unit 530 establishes a BT connection with the portable information terminal 10. In this case, when a connection was established between the terminals in the past, pairing information at that time is registered. The display unit 540 displays a map image and the like generated by the navigation unit 520. When the portable information terminal 10 has been connected to the smartwatch 20 and the car-mounted device 30, the display unit 540 may further display information transmitted from the portable information terminal 10 and measurement information (such as a blood pressure and a heart rate) about the human body which is transmitted from the smartwatch 20. The audio output unit 550 outputs voice guidance or the like generated by the navigation unit 520. When the portable information terminal 10 has been connected to the car-mounted device 30, the audio output unit 550 may further output audio data or the like transmitted from the portable information terminal 10.

The vehicle condition detecting unit 560 obtains information about the state of the vehicle in which the car-mounted device 30 is mounted. For example, the vehicle condition detecting unit 560 obtains gear position information, vehicle speed information, and the like, for example, via a bus in the vehicle. The vehicle condition detecting unit 560 may handle other information other than those described above. The storage unit 570 stores map data used by the navigation unit 520 as well as data, application programs, and the like which are necessary for the car-mounted device 30.

The controller 580 includes a microprocessor or a microcontroller, and executes programs or the like stored in a ROM/RAM or the storage unit 570, thereby controlling the units. In the first embodiment, the controller 580 transmits, to the portable information terminal 10, a condition signal necessary to determine whether or not notification operations of the smartwatch 20 are to be limited, and executes an information providing program 600 for searching for a device which is present near the car-mounted device 30 and with which wireless communication may be performed.

Figure 10:
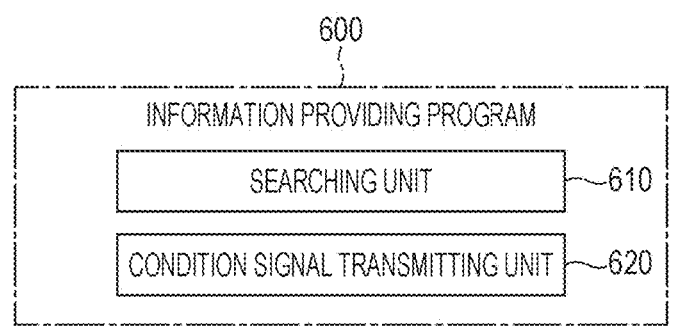
FIG. 10 is a diagram illustrating the functional configuration of an information providing program of the car-mounted device according to the first embodiment.

FIG. 10 is a diagram illustrating an exemplary functional configuration of the information providing program 600. The information providing program 600 includes a searching unit 610 and a condition signal transmitting unit 620. After an ignition key of the vehicle is operated to turn on the accessory mode (ACC), when power is supplied to the car-mounted device 30, the searching unit 610 searches for a device which is present near the car-mounted device 30 and with which a BT connection may be established, through the communication unit 530. Preferably, in the case where a BT connection was established between the car-mounted device 30 and the portable information terminal 10 in the past, the searching unit 610 searches for the portable information terminal 10 on the basis of the registered pairing information. The searching unit 610 transmits a request signal for establishing a BT connection, to the portable information terminal 10 which has been found. When a response to the request signal is returned from the portable information terminal 10, a BT connection is established between the car-mounted device 30 and the portable information terminal 10.

After the searching unit 610 transmits the request signal, when a BT connection is established, the condition signal transmitting unit 620 transmits, to the portable information terminal 10, a condition signal indicating that the request signal has been transmitted through the BT connection or that the BT connection has been established between the devices. Further, the condition signal transmitting unit 620 may transmit, to the portable information terminal 10, information about the state of the vehicle which is detected by the vehicle condition detecting unit 560, distance information (which is equivalent to a signal indicating on/off information of a BT connection) of the portable information terminal 10, as a condition signal necessary to determine the environment in which the smartwatch 20 is used.

Figure 11:
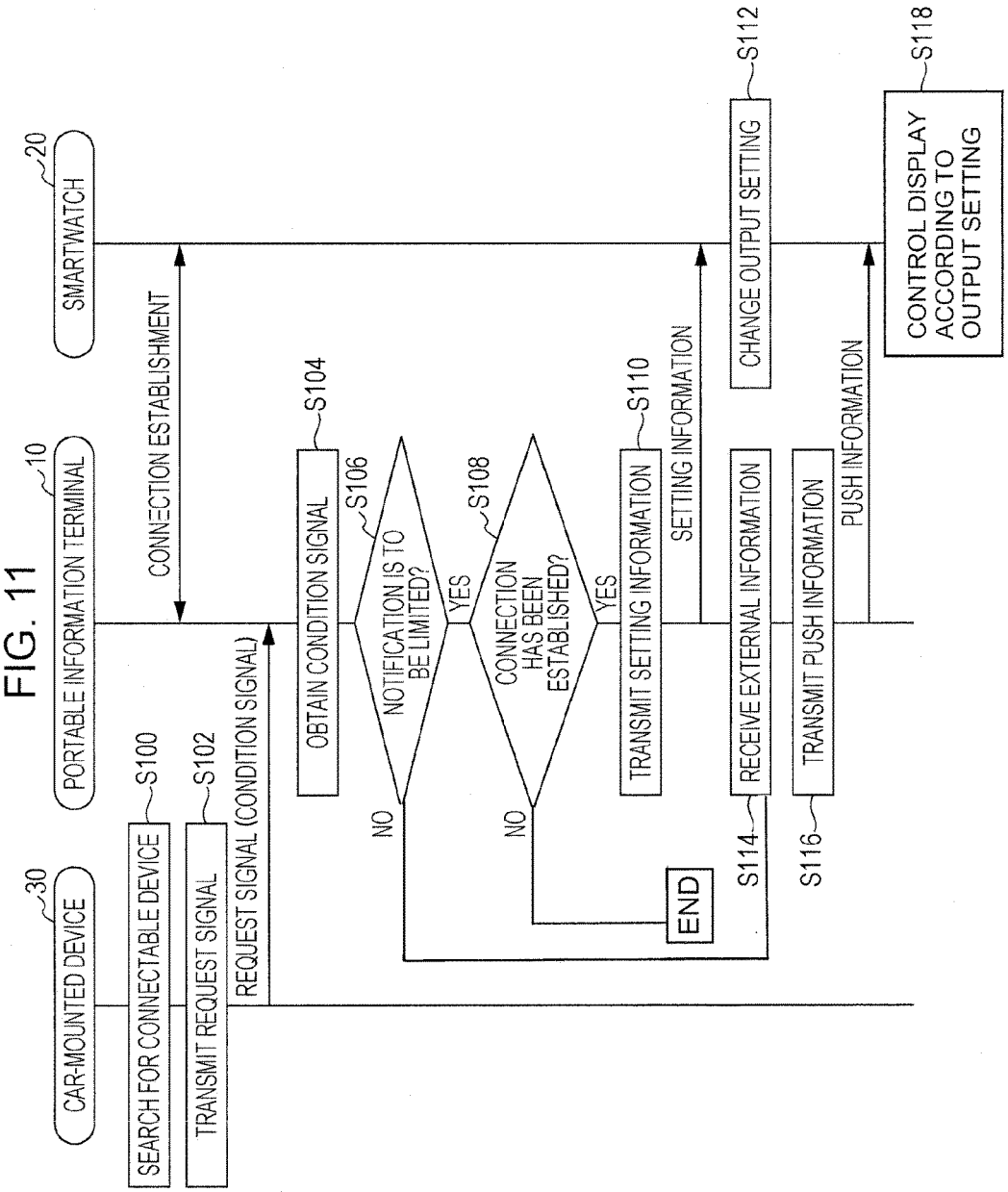
FIG. 11 is a flow diagram illustrating operations performed in the information notifying system according to the first embodiment of the present disclosure.

Operations in the information notifying system according to the first embodiment will be described with reference to the flow chart in FIG. 11. In the information notifying system 1, when ACC is turned on, the car-mounted device 30 is activated, which causes the information providing program 600 to be executed. The searching unit 610 starts searching for the portable information terminal 10 which may be connected, through the communication unit 530 (S100). When the portable information terminal 10 is found, the communication unit 530 transmits, to the portable information terminal 10, a request signal for establishing a connection (S102). The communication unit 100 of the portable information terminal 10 receives the request signal and responds to the request signal, causing a connection to be established between the devices.

In this example, the request signal also serves as a condition signal. Therefore, the condition signal transmitting unit 620 transmits a condition signal by transmitting the request signal. Other than this, in response to transmission of the request signal or establishment of a connection between the devices, the condition signal transmitting unit 620 may separately transmit, to the portable information terminal 10, a condition signal indicating transmission of the request signal or establishment of a connection between the devices. When the condition signal acquiring unit 220 of the portable information terminal 10 receives the condition signal (S104), the notification limitation determining unit 230 determines whether or not notification operations of the smartwatch 20 are to be limited, on the basis of the condition signal (S106). If the notification limitation determining unit 230 determines that the notification operations are to be limited, the connection determining unit 240 determines whether or not a connection has been established with the smartwatch 20 (S108). If the connection determining unit 240 determines that a connection has been established with the smartwatch 20, the notification controller 250 generates setting information for changing the output setting of the smartwatch 20, and transmits the setting information to the smartwatch 20 (S110). The notification controller 250 generates, for example, the setting information including the setting code "01" (see FIG. 6) with which only the display of the smartwatch 20 is deactivated, and transmits the setting information. The setting information receiving unit 410 of the smartwatch 20 receives the setting information, and the setting changing unit 420 changes the output setting in accordance with the setting information (S112). Thus, notification operations of the smartwatch 20 are limited.

After that, when the portable information terminal 10 receives external information (S114), the push information transmitting unit 210 notifies the smartwatch 20 of information, that is, push information, about a push notification or a pop-up notification which indicates that external information has been received (S116). Since the output setting has been changed so that notification operations of smartwatch 20 are limited, the push information is not displayed on the display unit 320 of the smartwatch 20 (S118). If the vibrating unit 340 and the audio output unit 350 have been activated so that the operations of the vibrating unit 340 and the audio output unit 350 are enabled, a vibration, a beep, and the like are output.

For example, when a condition signal, as illustrated in FIG. 4, which is determined to indicate the normal notification is obtained, the notification controller 250 transmits, to the smartwatch 20, setting information having the setting code "00", causing the notification limitation of the smartwatch 20 to be released.

Thus, in the information notifying system in the first embodiment, when it is determined that a user is driving, notification operations of the smartwatch 20 are automatically limited. Therefore, a viewing operation which may cause a danger during driving may be prevented. In the first embodiment, notification operations of a smartwatch are limited. However, the wireless connection between the portable information terminal 10 and the smartwatch 20 is maintained. Therefore, measurement information obtained through measurement of a heartbeat, a health log, and the like which is an original function of the smartwatch 20 may be transmitted to the portable information terminal 10 during driving. The portable information terminal 10 may monitor the driver who is driving, on the basis of the measurement information. When an event (such as a rapid increase in heartbeat) which triggers a push notification occurs during measurement, the portable information terminal 10 may cause the display unit 540 of the car-mounted device 30 to display the push notification.

A modified embodiment of the first embodiment will be described. In the above-described embodiment, the example is described in which, when it is determined that notification operations of the smartwatch 20 are to be limited, the portable information terminal 10 transmits, to the smartwatch 20, control information as illustrated in FIG. 6. In the modified embodiment, when the smartwatch 20 is provided with an on/off setting function of turning on/off notification of a push notification or a pop-up notification, the portable information terminal 10 may control the on/off setting. That is, when it is determined that notification operations of the smartwatch 20 are to be limited, the portable information terminal 10 transmits, to the smartwatch 20, setting information for turning off notification of a push notification or a pop-up notification. When it is determined that the notification operations are not to be limited, the portable information terminal 10 transmits, to the smartwatch 20, setting information for turning on notification of a push notification or a pop-up notification.

In the above-described embodiment, the example is described in which, in response to an operation of turning ACC on, power is supplied to the car-mounted device 30. However, for example, assume that the communication unit 530 of the car-mounted device 30 has a module configuration in which the operation of turning ACC on does not cause power to be supplied and in which power is supplied even when ACC is turned off. When the portable information terminal 10 approaches the car-mounted device 30 within the certain distance, a request signal for establishing a connection is automatically transmitted. When the portable information terminal 10 is located away from the car-mounted device 30 by the certain distance, the BT connection is automatically disconnected. In this case, even when ACC has been turned off, the portable information terminal 10 which approaches the car-mounted device 30 within the certain distance may trigger change of the output setting of the smartwatch 20. The portable information terminal 10 which is located away from the car-mounted device 30 by the certain distance may trigger an operation of returning the output setting back to the original one.

A second embodiment of the present disclosure will be described. In the first embodiment, the output setting of the smartwatch 20 is changed, causing notification of push information to be limited. In the second embodiment, the output setting provided for the portable information terminal 10 is changed, causing notification of push information to be limited.

Figure 12:
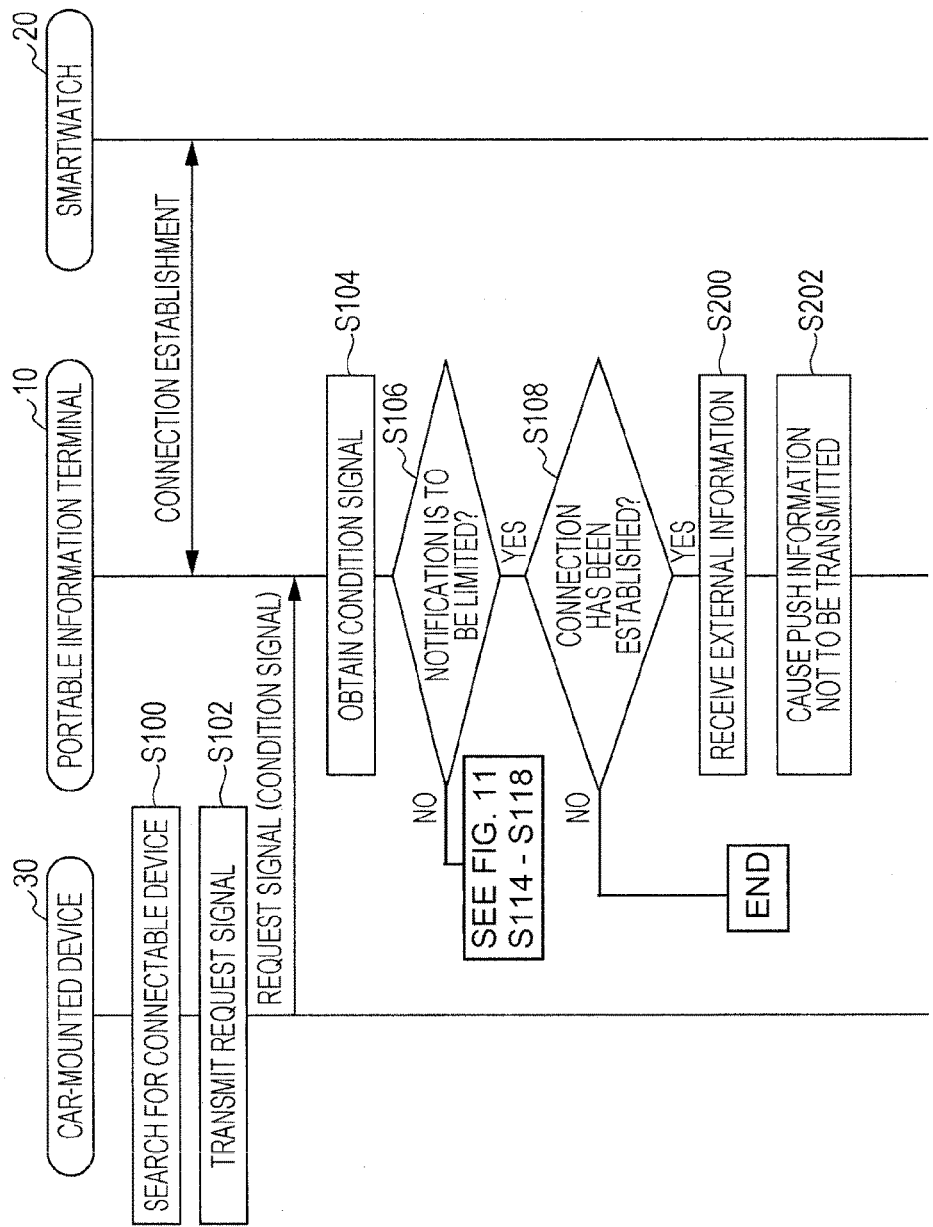
FIG. 12 is a flow diagram illustrating operations performed in an information notifying system according to a second embodiment of the present disclosure.

FIG. 12 illustrates an operation flow performed in an information notifying system according to the second embodiment. Steps S100 to S108 are the same as those in FIG. 11 in the first embodiment, and will not be described. When the portable information terminal 10 receives external information (S200), the notification controller 250 does not transmit setting information for changing the output setting of the smartwatch 20. Instead, the notification controller 250 prohibits the push information transmitting unit 210 from transmitting push information. That is, push information is not transmitted to the smartwatch 20 in response to reception of external information. Therefore, since the smartwatch 20 does not receive push information, outputting of push information is limited.

A third embodiment of the present disclosure will be described. In the second embodiment, when external information is received, push information is not transmitted to the smartwatch 20. In the third embodiment, push information which is not transmitted is accumulated. When notification limitation of the smartwatch 20 is released, the accumulated push information is transmitted to the smartwatch 20.

Figure 13:
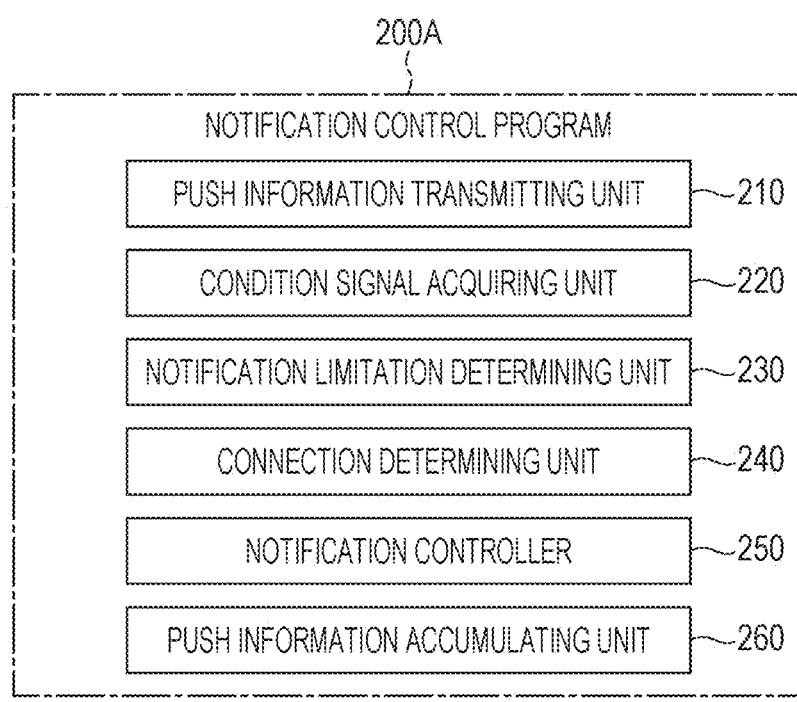
FIG. 13 is a diagram illustrating the functional configuration of a notification control program according to a third embodiment of the present disclosure.

FIG. 13 is a diagram illustrating the functional configuration of a notification control program 200A according to the third embodiment. In the third embodiment, the notification control program 200A further includes a push information accumulating unit 260. When the push information transmitting unit 210 is not to transmit push information, the push information accumulating unit 260 accumulates the push information. When the notification limitation determining unit 230 determines that notification operations of the smartwatch 20 are not to be limited (when notification limitation is released), the push information transmitting unit 210 transmits, to the smartwatch 20, the push information accumulated by the push information accumulating unit 260. Thus, the smartwatch 20 may display received push information.

Figure 14:
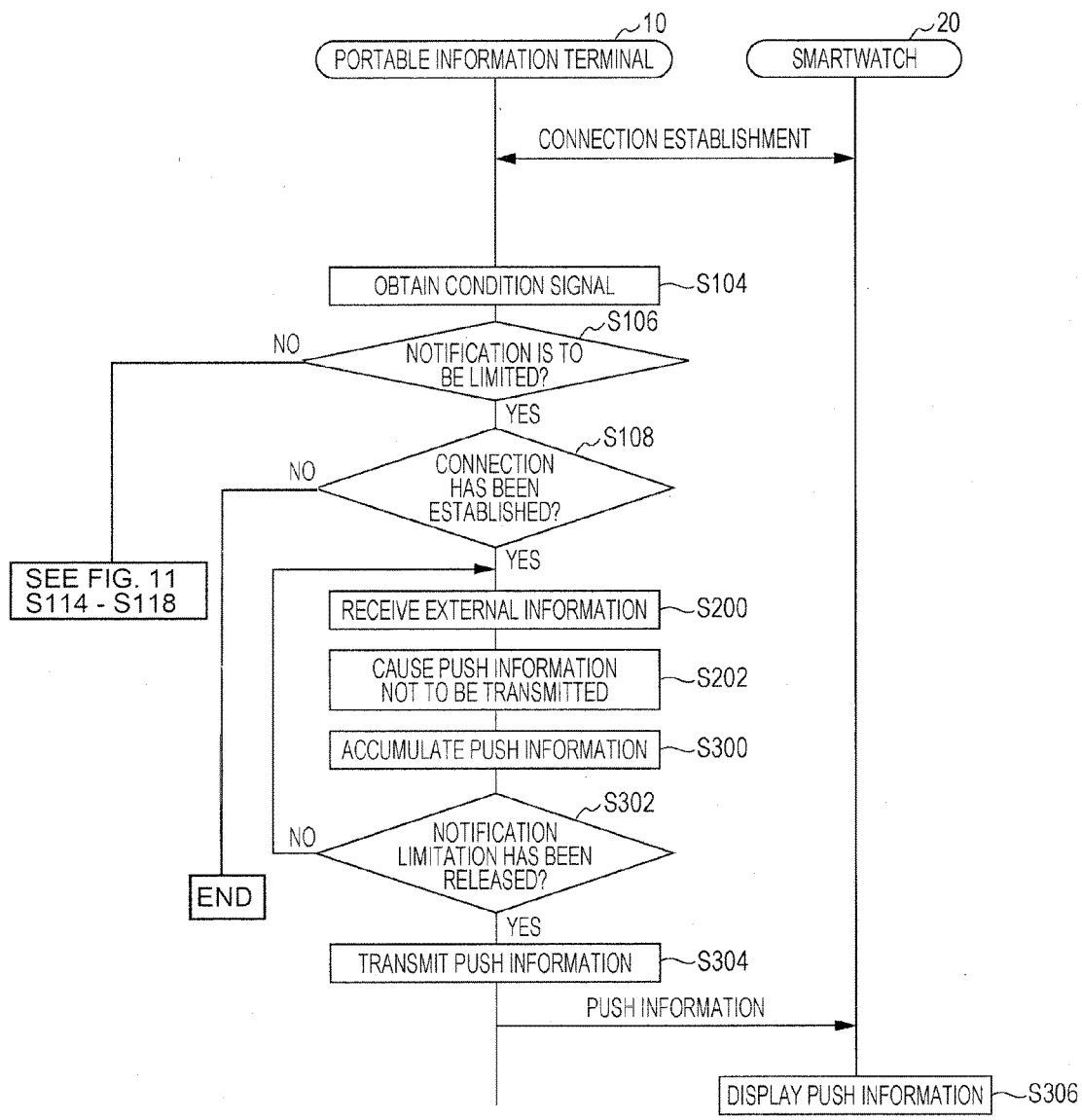
FIG. 14 is a flow diagram illustrating operations performed in an information notifying system according to the third embodiment of the present disclosure.

FIG. 14 is a flow diagram illustrating operations in an information notifying system according to the third embodiment. Steps until step S202 are similar to those in the second embodiment, and will not be described. During a period in which notification operations of the smartwatch 20 are limited, even when external information is received, push information is not transmitted. The push information is accumulated by the push information accumulating unit 260 (S300).

When the notification limitation determining unit 230 determines that notification operations of the smartwatch 20 are not to be limited (S302), the push information transmitting unit 210 transmits, to the smartwatch 20, the push information accumulated by the push information accumulating unit 260 (S304). When the smartwatch 20 receives the push information, the smartwatch 20 displays the push information on the display unit 320 (S306).

In the third embodiment, an example is described in which, when push information is not transmitted, the push information is accumulated. In the case where, as in the first embodiment, notification of push information is eventually not performed on the smartwatch 20 even when the push information is transmitted, the push information may be similarly accumulated. When notification limitation of the smartwatch 20 is released, the push information may be transmitted again.

A fourth embodiment of the present disclosure will be described. In the first and third embodiments, the output setting provided for the portable information terminal is changed, or the output setting provided for the smartwatch is changed. In the fourth embodiment, the output setting of the smartwatch 20 is not automatically changed, and a user is presented with guidance information, causing change of the output setting of the smartwatch 20 to be prompted.

Figure 15A:
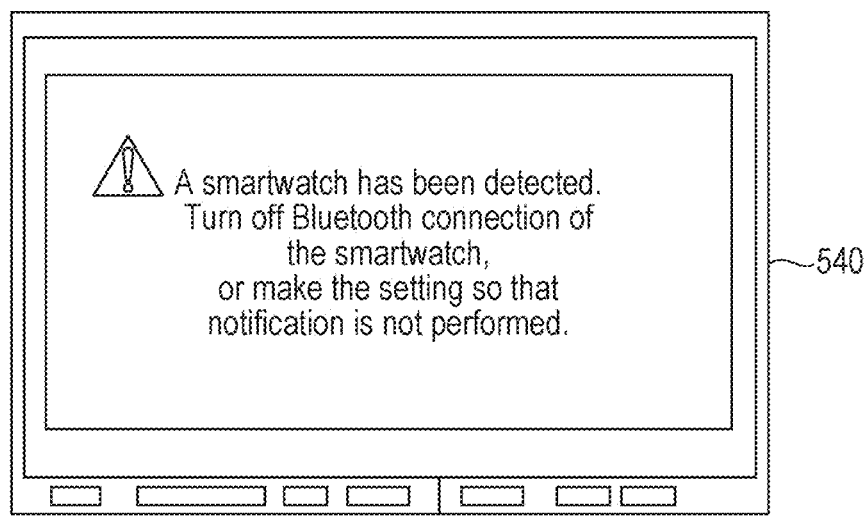
FIGS. 15A and 15B are diagrams illustrating exemplary displays of guidance information according to a fourth embodiment of the present disclosure.
Figure 15B:
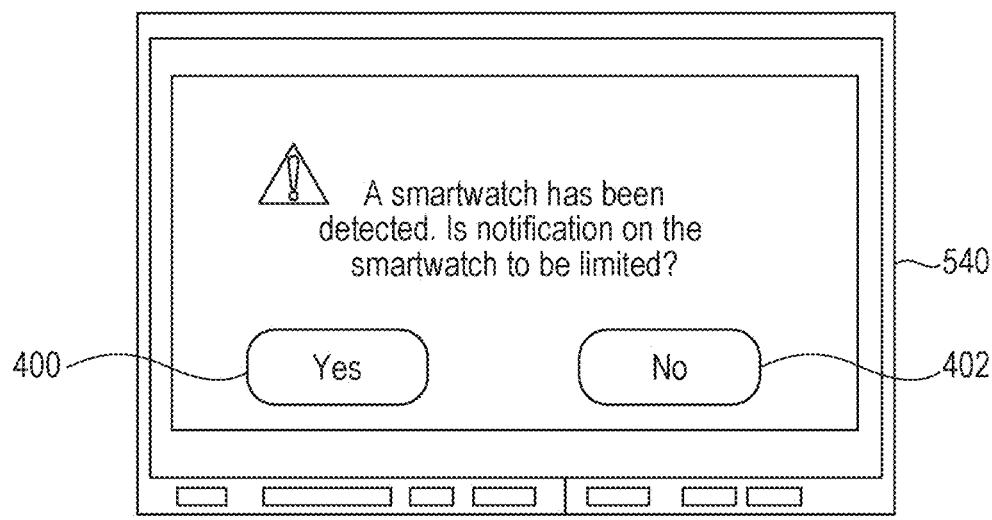
Figure 17:
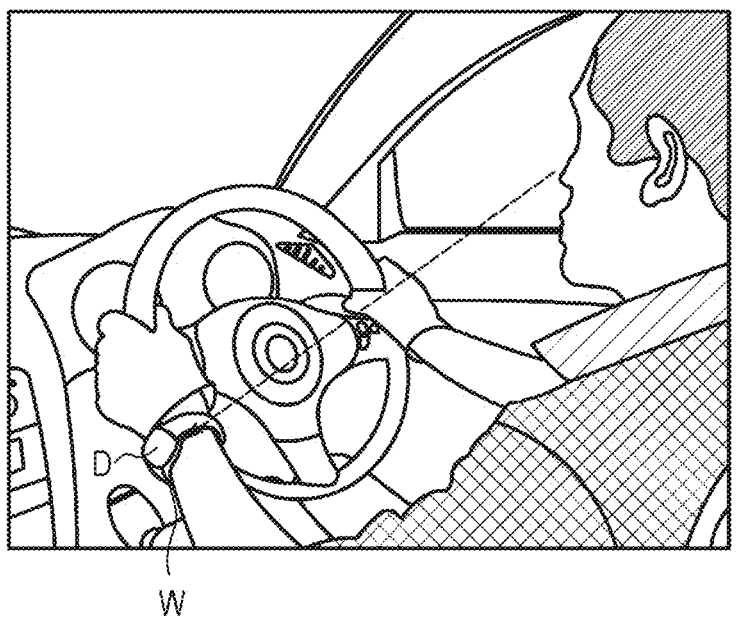
FIG. 17 is a diagram for describing an issue of the related art.

When it is determined that notification operations of the smartwatch 20 are to be limited, the notification controller 250 (see FIGS. 3 and 13) does not generate/transmit setting information for changing the output setting of the smartwatch 20. When external information is received, the notification controller 250 causes push information not to be transmitted to the smartwatch 20, and causes the display unit 540 of the car-mounted device 30 to display guidance information. For example, as illustrated in FIG. 15A, the guidance information may include a warning message such as a message with which limitation of notification operations of the smartwatch 20 is prompted. Alternatively, as illustrated in FIG. 15B, the guidance information may include user input buttons 400 and 402 which are used for limitation of notification operations of the smartwatch 20. Such guidance information may be transmitted by the notification controller 250 to the car-mounted device 30 via the connecting unit 3, or may be prepared in advance in the car-mounted device 30.

The guidance information may be displayed in any manner. For example, the guidance information as illustrated in FIG. 15A may be displayed for a certain period so as to attract attention. Alternatively, until the smartwatch 20 terminates the connection of the connecting unit 2, the display may be continued. When the guidance information as illustrated in FIG. 15B is displayed, in response to a user input on the input button 400 on the guidance information, the notification controller 250 may terminate the BT connection of the smartwatch 20, or may change the output setting so that notification operations of the smartwatch 20 are limited. In another display manner, a user himself/herself may use the input unit 310 of the smartwatch 20, for example, to turn off the setting for a push notification in the smartwatch 20 or change the setting of the smartwatch 20 so that the notification operations are limited.

FIG. 16 is a flow illustrating operations in an information notifying system according to the fourth embodiment. Steps S100 to S108 are similar to those in the first embodiment, and will not be described. In the fourth embodiment, when it is determined that the smartwatch 20 has been connected (S108), the notification controller 250 transmits the guidance information to the car-mounted device 30 and instructs the car-mounted device 30 to display the guidance information (S400). According to the instruction, the car-mounted device 30 displays the guidance information on the display unit 540 (S402). For example, when the guidance information as illustrated in FIG. 15B is displayed, a user input on the car-mounted device 30 is transmitted to the portable information terminal 10. When permission to limit notification operations of the smartwatch 20 is obtained on the basis of the user input, similarly to the first embodiment, the notification controller 250 transmits, to the smartwatch 20, setting information for changing the output setting of the smartwatch 20 (S404). The smartwatch 20 changes the output setting in accordance with the setting information (S406).

Thus, according to the fourth embodiment, the guidance information is displayed, and, when permission from a user is obtained, notification operations of the smartwatch 20 are limited. Therefore, after recognition of the environment in which the smartwatch 20 is used, the user may determine whether or not notification operations of the smartwatch 20 are to be limited.

What is claimed is:

1. An information terminal comprising:
    a communication unit that: i) enables a first wireless communication to be performed with a portable terminal, ii) enables a second wireless communication to be performed with an electronic device, iii) acquires external information, iv) transmits a notification about acquisition of the information to the portable terminal when the information is acquired; and,
    a controller that determines whether or not a notification operation of the portable terminal is to be limited, on the basis of a condition signal received from the electronic device via the communication unit, and that controls transmission of the notification by the communication unit on the basis of a determination result.

2. The information terminal according to claim 1, wherein, when it is determined that the notification operation of the portable terminal is to be limited, the controller causes the communication unit not to transmit the notification about acquisition of the information to the portable terminal.

3. The information terminal according to claim 1, wherein, when it is determined that the notification operation of the portable terminal is to be limited, the controller causes setting information to be transmitted to the portable terminal, the setting information causing the notification operation of the portable terminal to be limited.

4. The information terminal according to claim 3, wherein the setting information includes information for changing an output setting of the portable terminal.

5. The information terminal according to claim 4, wherein the setting information is used to disable displaying on the portable terminal and to enable a different output.

6. The information terminal according to claim 5, wherein the different output is a vibration output of the portable terminal.

7. The information terminal according to claim 5, wherein the different output is an audio output of the portable terminal.

8. The information terminal according to claim 1, wherein, when it is determined that the notification operation of the portable terminal is to be limited, the controller accumulates the notification about acquisition of the information, and
wherein, when it is determined that the notification operation of the portable terminal is not to be limited, the controller transmits the notification about acquisition of the information via the communication unit to the portable terminal.

9. The information terminal according to claim 1, wherein, when the condition signal indicates an engine start of a vehicle, the controller determines that the notification operation of the portable terminal is to be limited.

10. The information terminal according to claim 1, wherein, when the condition signal indicates a vehicle speed equal to or larger than a certain value, the controller determines that the notification operation of the portable terminal is to be limited.

11. The information terminal according to claim 1, wherein, when the condition signal indicates that a vehicle has stopped, the controller determines that the notification operation of the portable terminal is not to be limited.

12. The information terminal according to claim 1, wherein, the condition signal indicates that a distance from a vehicle is equal to or smaller than a certain value, the controller determines that the notification operation of the portable terminal is to be limited.

13. The information terminal according to claim 1, wherein the portable terminal is a wearable terminal which is capable of being worn on a user's human body, and
wherein when information about the human body is received via the communication unit from the wearable terminal, the controller provides the information about the human body via the communication unit to the electronic device.

14. The information terminal according to claim 13, wherein, when a heart rate or a blood pressure which is included in the information about the human body becomes equal to or larger than a certain value, the controller further provides recommendation information via the communication unit to the electronic device.

15. The information terminal according to claim 1, wherein the controller further transmits the notification about acquisition of the information via the communication unit to the electronic device.

16. The information terminal according to claim 13, wherein, when it is determined that the notification operation of the wearable terminal is to be limited, the controller further causes guidance information to be displayed on the electronic device, the guidance information describing that the notification operation of the wearable terminal is to be limited.

17. The information terminal according to claim 16, wherein, when a user input is received in response to the guidance information, the controller further performs notification limitation on the wearable terminal.

18. A system comprising:
a portable terminal;
an information terminal; and,
an electronic device,
wherein the information terminal includes a communication unit that: i) enables a first wireless communication to be performed with a portable terminal ii) enables a second wireless communication to be performed with an electronic device; iii) acquires external information; and, iv) transmits a notification about acquisition of the information via the communication unit to the portable terminal, when the information is acquired; and,
a controller that determines whether or not a notification operation of the portable terminal is to be limited, on the basis of a condition signal received from the electronic device via the communication unit; and that controls the transmission of the notification by the communication unit on the basis of a determination result.

19. An information notification method in an information terminal including a communication unit that i) enables wireless communication to be performed with a portable terminal, ii) enables wireless communication to be performed with an electronic device, and iii) acquires external information, the method comprising:
determining whether or not a notification operation of the portable terminal is to be limited, on the basis of a condition signal received via the communication unit from the electronic device; and
in the case where it is determined that the notification operation of the portable terminal is not to be limited, when the communication unit acquires the information, transmitting a notification about acquisition of the information via the communication unit to the portable terminal, and, in the case where it is determined that the notification operation of the portable terminal is to be limited, transmitting, to the portable terminal, setting information for changing an output setting of the portable terminal.

* * * * *